(12) United States Patent
Cornelius et al.

(10) Patent No.: US 9,631,551 B2
(45) Date of Patent: Apr. 25, 2017

(54) INTERNAL COMBUSTION ENGINE INCLUDING A BOOSTER

(71) Applicant: VOLKSWAGEN AKTIENGESELLSCHAFT, Wolfsburg (DE)

(72) Inventors: Volker Cornelius, Cremlingen (DE); Axel Groenendijk, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/824,196

(22) Filed: Aug. 12, 2015

(65) Prior Publication Data

US 2015/0345374 A1    Dec. 3, 2015

Related U.S. Application Data

(63) Continuation of application No. PCT/EP2014/051679, filed on Jan. 29, 2014.

(30) Foreign Application Priority Data

Feb. 13, 2013    (DE) .................. 10 2013 002 530

(51) Int. Cl.
*F02B 37/16*    (2006.01)
*F02D 23/00*    (2006.01)
(Continued)

(52) U.S. Cl.
CPC .............. *F02B 37/16* (2013.01); *F02B 37/04* (2013.01); *F02D 23/00* (2013.01); *F02D 23/005* (2013.01);
(Continued)

(58) Field of Classification Search
CPC .......... F02B 37/04; F02B 37/16; F02D 23/00; F02D 23/005; F02M 26/17; F02M 35/10163; Y02T 10/144
(Continued)

(56) References Cited

U.S. PATENT DOCUMENTS 4,392,352 A    7/1983 Stumpp et al.
5,335,500 A    8/1994 Wunderlich et al.
(Continued)

FOREIGN PATENT DOCUMENTS

CN    101382082 A    3/2009
CN    101749121 A    6/2010
(Continued)

OTHER PUBLICATIONS

"Kraftfahrtechnisches Taschenbuch [Automotive Handbook]", 27th edition, Vieweg+Teubner Verlag, 2011, p. 479.
(Continued)

*Primary Examiner* — Nicholas J Weiss
*Assistant Examiner* — Dapinder Singh
(74) *Attorney, Agent, or Firm* — Manfred Beck, P.A.

(57) ABSTRACT

An internal combustion engine includes working cylinders and a fresh gas line for supplying fresh gas to the working cylinders. The fresh gas line has a charge air section. A mechanically driven compressor is disposed in the charge air section of the fresh gas line. An air control/shut-off flap is disposed in the charge air section such that, in dependence on a position of the air control/shut-off flap, a gas mass flow in the charge air section flows completely or partially via the mechanically driven compressor or flows past the mechanically driven compressor. A method for operating an internal combustion engine is also provided.

15 Claims, 11 Drawing Sheets

(51) Int. Cl.
*F02M 35/10* (2006.01)
*F02B 37/04* (2006.01)
*F02M 26/17* (2016.01)

(52) U.S. Cl.
CPC ...... *F02M 26/17* (2016.02); *F02M 35/10163* (2013.01); *Y02T 10/144* (2013.01)

(58) Field of Classification Search
USPC ................................. 60/602, 605.1, 605.2
See application file for complete search history.

(56) References Cited

U.S. PATENT DOCUMENTS

| | | | |
|---|---|---|---|
| 9,200,578 B2* | 12/2015 | Flohr | F02B 37/001 |
| 2005/0022525 A1 | 2/2005 | Ellmer et al. | |
| 2007/0261394 A1 | 11/2007 | Mandrusiak | |
| 2008/0110170 A1 | 5/2008 | Noodt et al. | |
| 2009/0007563 A1* | 1/2009 | Cooper | F02B 33/32 |
| | | | 60/600 |
| 2009/0064677 A1 | 3/2009 | Farmer | |
| 2009/0223477 A1 | 9/2009 | Ito et al. | |
| 2010/0154757 A1 | 6/2010 | Miyamoto et al. | |
| 2010/0170460 A1 | 7/2010 | Leone et al. | |
| 2011/0100325 A1 | 5/2011 | Wu | |
| 2012/0297769 A1 | 11/2012 | Gerum | |

FOREIGN PATENT DOCUMENTS

| | | |
|---|---|---|
| DE | 943 203 B | 5/1956 |
| DE | 28 23 255 A1 | 12/1979 |
| DE | 32 27 459 A1 | 1/1984 |
| DE | 42 10 070 C2 | 10/1996 |
| DE | 197 54 353 A1 | 6/1999 |
| DE | 697 12 317 T2 | 11/2002 |
| DE | 101 59 801 A1 | 4/2003 |
| DE | 101 58 535 A1 | 6/2003 |
| DE | 102 02 146 B4 | 12/2005 |
| DE | 10 2005 004 122 A1 | 8/2006 |
| DE | 101 64 792 B4 | 8/2006 |
| DE | 10 2006 000 075 A1 | 9/2006 |
| DE | 10 2007 039 209 A1 | 2/2009 |
| DE | 10 2010 060 060 A1 | 5/2011 |
| DE | 10 2012 009 288 A1 | 11/2012 |
| EP | 0 879 345 B1 | 5/2002 |
| EP | 1 974 136 B1 | 4/2010 |
| JP | 6014035 Y2 | 4/1994 |
| KR | 20120113761 A | 10/2012 |
| WO | 2007/083131 A1 | 7/2007 |
| WO | 2007091542 A1 | 8/2007 |

OTHER PUBLICATIONS

Search Report issued by the German Patent and Trademark Office for German Patent Application No. DE 10 2013 002 530.3, dated Oct. 16, 2013.

Search Report including Provisional Assessment of Patentability issued by the German Patent and Trademark Office for German Patent Application No. DE 10 2014 201 549.9, dated Apr. 23, 2014.

International Search Report for International Application No. PCT/EP2014/051679 and translation thereof, dated May 15, 2014.

International Preliminary Report on Patentability for International Application No. PCT/EP2014/051679 including Written Opinion of the International Searching Authority and translation thereof, dated Aug. 15, 2015.

English language translation of Search Report issued by the State Intellectual Property Office of People's Republic of China, dated Dec. 1, 2016, which corresponds to Chinese Patent Application No. 201480008790.6 and is related U.S. Appl. No. 14/824,196.

* cited by examiner

INTERNAL COMBUSTION ENGINE INCLUDING A BOOSTER

CROSS-REFERENCE TO RELATED APPLICATIONS

This application is a continuation, under 35 U.S.C. §120, of copending International Application No. PCT/EP2014/051679, filed Jan. 29, 2014, which designated the United States; this application also claims the priority, under 35 U.S.C. §119, of German Patent Application No. DE 10 2013 002 530.3, filed Feb. 13, 2013; the prior applications are herewith incorporated by reference in their entirety.

BACKGROUND OF THE INVENTION

Field of the Invention

The invention relates to an internal combustion engine including a fresh gas line for supplying combustion air to working cylinders of the internal combustion engine, wherein a mechanically, in particular electrically, driven compressor is disposed in a charge air section of the fresh gas line. The invention also relates to a method for operating an internal combustion engine.

German Patent No. DE 102 02 146 B4, which corresponds to U.S. Patent Application Publication No. US 2005/0022525 A1, discloses an internal combustion engine including an exhaust gas turbocharger, wherein an electrically driven compressor is disposed in a fresh gas line upstream of a compressor of the charging device, specifically of an exhaust gas turbocharger. In order to achieve a sufficient air mass flow in the case of a small compressor, a bypass duct for the compressor is provided with an additional, activatable flap. However, the flap causes a pressure loss in the fresh gas line.

For the quasi-stationary exhaust gas turbocharging operation, "Kraftfahrtechnisches Taschenbuch [Automotive Handbook]", 27th edition, Vieweg+Teubner Verlag, 2011, page 479 discloses improving the response behavior of an exhaust gas turbocharger configured for high nominal powers through the use of a series connection with an electrically driven flow compressor ("booster"). The usable characteristic map range is extended by the series connection of two flow compressors. The booster can be positioned in the flow direction upstream or downstream of the exhaust gas turbocharger. A bypass permits the booster to be circumvented if the booster does not charge. One possible way of operating this system is operation of the electrically driven stage exclusively in transient operating phases in the lower rotational speed range of the engine.

European Patent Document No. EP 1 974 136 B1, which corresponds to U.S. Patent Application Publication No. US 2009/0007563 A1, discloses a charged diesel engine in which a junction is formed downstream of a compressor of a turbocharger, at which the intake line divides into a first duct with a throttle valve and a bypass duct circumventing the first duct and having a further throttle valve and a compressor disposed downstream of the throttle valve. The two ducts open again into the common intake line upstream of a following charge air cooler. In addition, a high-pressure exhaust gas recirculation duct opens between the compressor and the throttle valve into the bypass duct. Exhaust gas recirculation therefore takes place only when the compressor is switched on. If, however, the latter is merely used in order, in the event of sudden increases in load, to ensure an additional air filling of the cylinders, this arrangement is not expedient since, in these load situations, only small amounts of exhaust gas are recycled.

Furthermore, German Patent Application No. DE 10 2010 060 060 A1, which corresponds to U.S. Patent Application Publication No. US 2011/0100325 A1, discloses a three-way throttle valve which is disposed in an air inlet line in the region of a bypass duct branching off from the air inlet line. The bypass duct has an opening into which exhaust gas from an exhaust gas recirculation system can flow. The exhaust gas is entrained by the air in the bypass duct and passes via a mouth of the bypass duct into the intake line again. In a first position, this throttle valve closes the intake line substantially, specifically, in such a manner that all of the air flows into the bypass duct. This serves to increase the exhaust gas recirculation rate at low rotational speeds of the engine. In a reverse throttle position, the airflow into the bypass duct and the intake line is intended to be controlled simultaneously. Control for intake systems for charged combustion engines having an additional electric compressor is not disclosed.

SUMMARY OF THE INVENTION

It is accordingly an object of the invention to provide an internal combustion engine which overcomes the above-mentioned disadvantages of the heretofore-known internal combustion engines of this general type. It is a further object of the invention to provide an improved method for operating an internal combustion engine. It is in particular an object of the invention to improve the integration of a mechanically, in particular electrically, driven compressor into a charge air section of the fresh gas line of the internal combustion engine.

With the foregoing and other objects in view there is provided, in accordance with the invention, an internal combustion engine including:
  working cylinders;
  a fresh gas line for supplying fresh gas to the working cylinders, the fresh gas line having a charge air section;
  a mechanically driven compressor disposed in the charge air section of the fresh gas line; and
  an air control/shut-off flap disposed in the charge air section such that, in dependence on a position of the air control/shut-off flap, a gas mass flow in the charge air section flows completely or partially via the mechanically driven compressor or flows past the mechanically driven compressor.

In other words, according to the invention, there is provided an internal combustion engine including a fresh gas line for supplying fresh gas to working cylinders of the internal combustion engine, wherein a mechanically driven compressor is disposed in a charge air section of the fresh gas line, wherein an air control/shut-off flap is disposed in the charge air section in such a manner that a gas mass flow in the charge air section flows completely or partially via the mechanically driven compressor or past the mechanically driven compressor depending on a position of the air control/shut-off flap. The mechanically driven compressor can be disposed here parallel to the air control/shut-off flap.

This has the advantage that no additional component for circumventing the mechanically driven compressor is necessary for the bypass function for the mechanically driven compressor, and instead of a self-controlling, pressure-dependent function of a nonreturn valve in an additional bypass duct, a controlled function of the existing air control/shut-off flap can be used without an additional bypass duct.

At the same time, the possibility can be provided of keeping the two fresh air paths via the air control/shut-off flap, on the one hand, and the mechanically driven compressor, on the other hand, closed.

A connection of the mechanically driven compressor to the internal combustion engine that is particularly flexible in respect of the activation or inactivation of the mechanically driven compressor is achieved by the fact that the mechanically driven compressor is an electrically driven compressor.

According to another feature of the invention, the internal combustion engine includes a charging device having a compressor, wherein the compressor of the charging device is disposed in the fresh gas line upstream of the mechanically driven compressor.

The charging device is preferably an exhaust gas turbocharger, in particular a waste gate exhaust gas turbocharger or an exhaust gas turbocharger having variable turbine geometry.

According to another feature of the invention, the internal combustion engine includes a bypass duct having an inlet and an outlet, the bypass duct integrating the mechanically driven compressor; the charge air section of the fresh gas line includes a charge air section portion parallel to the mechanically driven compressor between the inlet and the outlet of the bypass duct; and the air control/shut-off flap is disposed and configured such that the air control/shut-off flap selectively opens or closes the charge air section portion parallel to the bypass duct.

A control function, which is particularly effective and at the same time is simple to realize, of the air control/shut-off flap additionally as a bypass flap for the mechanically driven compressor is achieved by the fact that the air control/shut-off flap is disposed and configured in such a manner that the air control/shut-off flap selectively opens or closes a portion of the charge air section parallel to the mechanically driven compressor between an inlet and an outlet of a bypass integrating the mechanically driven compressor.

According to another feature of the invention, the internal combustion engine includes a bypass duct having an outlet, the bypass duct integrating the mechanically driven compressor; and the air control/shut-off flap is disposed and configured such that the air control/shut-off flap selectively opens or closes the outlet of the bypass duct.

Disposing the air control/shut-off flap close to the engine is achieved by the fact that the air control/shut-off flap is disposed and configured in such a manner that the air control/shut-off flap selectively opens or closes an outlet of a bypass integrating the mechanically driven compressor (and therefore the mouth of the bypass into a main duct of the charge air section).

According to another feature of the invention, the internal combustion engine includes a bypass duct having an inlet, the bypass duct integrating the mechanically driven compressor; and the air control/shut-off flap is disposed and configured such that the air control/shut-off flap selectively opens or closes the inlet of the bypass duct.

A particularly functionally reliable additional function of the air control/shut-off flap as a bypass flap for the mechanically driven compressor is achieved by the fact that the air control/shut-off flap is disposed and configured in such a manner that the air control/shut-off flap selectively opens or closes an inlet of a bypass integrating the mechanically driven compressor (and therefore the outflow point of the bypass from a main duct of the charge air section).

According to another feature of the invention, the internal combustion engine includes a bypass duct having an inlet and an outlet; the mechanically driven compressor is integrated in the bypass duct; the charge air section of the fresh gas line includes a charge air section portion, the bypass duct circumventing the charge air section portion; the air control/shut-off flap is movable into a first position closing the charge air section portion upstream of the outlet of the bypass duct or downstream of the inlet of the bypass duct; and the air control/shut-off flap is movable into a second position closing the charge air section portion downstream of the outlet of the bypass duct or upstream of the inlet of the bypass duct.

In a preferred refinement of the internal combustion engine according to the invention, it can be provided that the mechanically driven compressor is integrated in a bypass duct circumventing a charge air section portion, and the air control/shut-off flap
- is movable into a first position closing the charge air section portion (32) upstream of an outlet (36) of the bypass duct (54) and/or downstream of an inlet (34) of the bypass duct (54), and
- is movable into a second position closing the charge air section portion (32) downstream of the outlet (36) of the bypass duct (54) or upstream of the inlet (34) of the bypass duct (54).

According to a further feature of the invention, the air control/shut-off flap is movable into a third position at least partially unblocking the charge air section portion.

Thus, the air control/shut-off flap is particularly preferably also movable into at least one third position, preferably a plurality of third positions, at least partially unblocking the charge air section portion. The gas mass flow supplied to the combustion engine can be controlled by moving the air control/shut-off flap into a (defined) third position.

Through the use of an individual air control/shut-off flap, both connecting or disconnecting of the mechanically driven compressor into or from the charge air section and also control of the gas mass flow supplied to the combustion engine and also complete closing of the charge air section to prevent afterrunning of a combustion engine of the internal combustion engine can therefore be realized.

According to yet another feature of the invention, a high-pressure exhaust gas recirculating duct opens into the charge air section downstream of the air control/shut-off flap.

Thus, through the use of the air control/shut-off flap, the mass flow of exhaust gas guided via a (high-pressure) exhaust gas recirculation system can also be influenced, for which purpose a corresponding (high-pressure) exhaust gas recirculation duct opens into the charge air section preferably downstream of the air control/shut-off flap. The influencing takes place here via the varying pressure drop, which is dependent on the respective position, across the air control/shut-off flap.

The air control/shut-off flap is preferably positioned in such a manner that a flap shaft of the air control/shut-off flap is disposed as an extension of a radially outer wall of a bypass duct portion forming an outlet of a flow housing of the compressor. The two closing positions can thus be realized in a simple manner. In addition, it is possible, through the use of the air control/shut-off flap, to prevent flow back out of the bypass duct into an intermediate space between the bypass duct and a flap body of the air control/shut-off flap.

The flap shaft of the air control/shut-off flap is preferably disposed centrally, i.e. running through the center of area of the corresponding duct cross section, in the charge air section. In the case of a circular duct cross section, a radial configuration is therefore produced. As a result, precise controllability of the gas mass flow can be made possible.

According to another feature of the invention, the mechanically driven compressor has a flow housing; the bypass duct has a bypass duct portion with a curved profile, the bypass duct portion forms an outlet for the flow housing and has a radially outer wall section bounding a flow in the bypass duct; and the air control/shut-off flap, in the first position thereof, is disposed as an extension of the radially outer wall section of the bypass duct portion.

In a preferred refinement of the internal combustion engine according to the invention, it can therefore be provided that the air control/shut-off flap, in the first position thereof, is disposed as an extension of a radially outer wall portion, restricting the flow in the bypass duct, of a bypass duct portion which forms an outlet of a flow housing of the compressor and has a curved profile. Formation of a vortex or turbulence can thereby be avoided and therefore the flow resistance can be reduced.

According to another feature of the invention, the bypass duct portion opens into the charge air section portion obliquely with respect to a central longitudinal axis of the charge air section portion.

Likewise for avoiding formation of a vortex or turbulence, it can thus be provided that, in the region of the mouth, a central longitudinal axis of the bypass duct portion is disposed obliquely with respect to a central longitudinal axis of the charge air section portion. Furthermore, as a result, with the throttle flap (partially) open (third position), flowing of fresh gas into the compressor counter to the designated flow direction can be avoided or at least reduced. It is preferably provided here that the bypass duct portion is oriented obliquely with respect to the central longitudinal axis of the charge air section portion in the flow direction if the air control/shut-off flap is disposed in the outlet of the bypass duct or in the vicinity thereof. If, by contrast, the air control/shut-off flap is disposed in the inlet of the bypass duct or in the vicinity thereof, it can preferably be provided that the bypass duct portion is oriented obliquely with respect to the central longitudinal axis of the charge air section portion counter to the flow direction.

According to another feature of the invention, the air control/shut-off flap, in the first position and the second position, is disposed obliquely with respect to a central longitudinal axis of the charge air section portion.

In a furthermore preferred refinement of the internal combustion engine according to the invention, it can thus also be provided that the air control/shut-off flap, in the first position and the second position, is disposed at an oblique angle with respect to a central longitudinal axis of the charge air section portion. As a result, a readily sealing bearing of the air control/shut-off flap against a wall of the charge air section portion can advantageously be brought about.

According to another feature of the invention, the bypass duct has a bypass duct portion with a curved profile, the bypass duct portion has a radially outer wall section bounding a flow in the bypass duct; and an angle between the air control/shut-off flap, in the first position, and a central longitudinal axis of the charge air section portion is up to 10° smaller than an angle between the central longitudinal axis of the charge air section portion and a central longitudinal axis of the bypass duct portion.

Preferably, an angle between the air control/shut-off flap, in the first position, and the central longitudinal axis of the charge air section portion can thus be up to 10° smaller than an angle between the central longitudinal axis of the charge air section portion and the central longitudinal axis of the bypass duct portion. The effect can thereby be achieved that the gas mass flow, when flowing out of the bypass duct, is merely slightly deflected in the direction of the charge air section portion. The flow resistance can thereby be reduced.

According to another feature of the invention, the mechanically driven compressor has a flow housing; the bypass duct has a bypass duct portion opening into the charge air section portion; the bypass duct portion and the charge air section portion each have a respective housing; and the housing of the bypass duct portion is formed integrally with the housing of the charge air section portion and the flow housing of the mechanically driven compressor.

It can therefore advantageously be provided that a housing of the bypass duct portion opening into the charge air section portion is formed integrally with a housing of the charge air section portion and with a flow housing of the compressor. This makes it possible in particular to reduce an installation outlay for a construction unit of the charge air section, which construction unit (at least) integrates the charge air section portion, the mechanically driven compressor and the air control/shut-off flap.

According to yet another feature of the invention, the air control/shut-off flap is actuable via an electromotive actuator. It is advantageous if the air control/shut-off flap is actuable via an electromotive actuator, from which precise adjustability of the air control/shut-off flap can result.

The internal combustion engine according to the invention can be an externally-supplied ignition (spark-igniting) or a self-igniting internal combustion engine. The internal combustion engine can be a four-stroke internal combustion engine and/or a piston internal combustion engine. In particular, the internal combustion engine can have three, four, five or six cylinders.

The internal combustion engine according to the invention is preferably used in a motor vehicle, in particular in a (railless) land vehicle.

A method for operating such an internal combustion engine can make provision that, when the mechanically driven compressor is switched on (during operation of a combustion engine of the internal combustion engine) for additional compression of the gas mass flow, the air control/shut-off flap is moved into a first position, as a result of which the entire gas mass flow is guided via the mechanically driven compressor, and, when the combustion engine of the internal combustion engine is switched off, the air control/shut-off flap is moved into the second position, as a result of which a supply of the gas mass flow to the combustion engine is completely interrupted and an inadvertent afterrunning of the combustion engine is prevented.

With the objects of the invention in view there is also provided, a method for operating an internal combustion engine, which includes:

providing a fresh gas line for supplying fresh gas to working cylinders of the internal combustion engine, wherein a mechanically driven compressor is disposed in a charge air section of the fresh gas line such that the mechanically driven compressor is integrated in a bypass duct circumventing a charge air section portion of the charge air section;

providing an air control/shut-off flap disposed in the charge air section such that a gas mass flow in the charge air section flows completely or partially via the mechanically driven compressor or past the mechanically driven compressor depending on a position of the air control/shut-off flap, wherein the air control/shut-off flap is movable into a first position closing the charge air section portion upstream of an outlet of the bypass duct or downstream of an inlet of the bypass duct, and wherein the air control/shut-off flap is movable into a second position closing the charge air section portion downstream of the outlet of the bypass duct or upstream of the inlet of the bypass duct; and controlling the air control/shut-off flap such that, when the mechanically driven compressor is switched on for an additional compression of the gas mass flow, the air control/shut-off flap is moved into the first position and such that, when a combustion engine of the internal combustion engine is switched off, the air control/shut-off flap is moved into the second position.

Other features which are considered as characteristic for the invention are set forth in the appended claims.

Although the invention is illustrated and described herein as embodied in an internal combustion engine including a booster and a method for operating an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
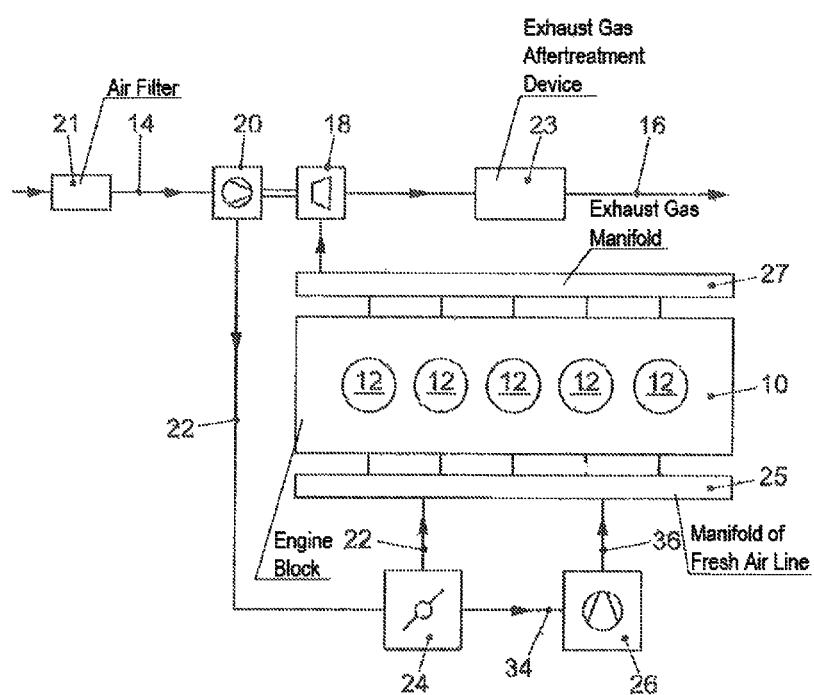
FIG. 1 is a schematic block diagram of a first preferred embodiment of an internal combustion engine according to the invention.

Referring now to the figures of the drawings in detail and first, particularly, to FIG. 1 thereof, there is shown the first preferred embodiment of an internal combustion engine according to the invention which has an engine block 10 of a combustion engine with working cylinders 12, five working cylinders 12 here by way of example, wherein each working cylinder 12 is connected in a fluid-conducting manner to a fresh gas line 14 and an exhaust gas line 16. The internal combustion engine has as charging device an exhaust gas turbocharger with a turbine 18 disposed in the exhaust gas line 16 and a compressor 20 disposed in the fresh gas line. A portion of the fresh gas line 14 downstream of the compressor 20 is referred to as charge air section 22. An air control/shut-off flap 24 is disposed in the charge air section 22. The air control/shut-off flap includes an activatable flap which, depending on position, changes or completely doses a flow cross section of the charge air section 22 and serves for air control and for shutting off the internal combustion engine. In the fresh gas line 14, an air filter 21 is disposed upstream of the compressor 20. In the exhaust gas line 16, an exhaust gas aftertreatment device 23, which includes, for example, a catalytic converter and/or a particle filter, is disposed downstream of the turbine 18. A manifold of the fresh gas line 14 is illustrated schematically by reference number 25 and an exhaust manifold of the exhaust gas line 16 is illustrated schematically by 27. The manifold 25 can also be referred to as suction pipe. A charge air cooler can be integrated or accommodated in the manifold 25.

According to the invention, a mechanically driven compressor 26, called "booster" below, is additionally disposed parallel to the air control/shut-off flap 24 in the charge air section 22. In this case, an inlet 34 of the booster 26 is connected in a fluid-conducting manner to the charge air section 22 upstream of the air control/shut-off flap 24 or, respectively, to the air control/shut-off flap 24, and an outlet 36 of the booster 26 is connected in a fluid-conducting manner to the charge air section 22 downstream of the air control/shut-off flap 24 or, respectively, to the manifold 25. The booster 26 serves for additionally compressing the fresh gas supplied to the working cylinders 12 and is driven, for example, by an electric motor. However, in the event of a high mass flow of the fresh gas in the fresh gas line 14 or, respectively, in the charge air section 22, the booster 26 would cause a high flow resistance, with the exhaust gas turbocharger simultaneously being able to provide an adequate charging pressure. In such operating phases of the internal combustion engine, the booster 26 is therefore switched off and the fresh gas conducted past the latter.

The configuration according to the invention of the booster 26 parallel to the air control/shut-off flap 24 means that no additional bypass duct with a corresponding bypass valve for the booster 26 is necessary, but, instead, the air control/shut-off flap 24 can be used for a bypass function, in which the mass flow of the fresh gas is conducted past the booster 26 and the booster 26 is shut off.

Figure 3:
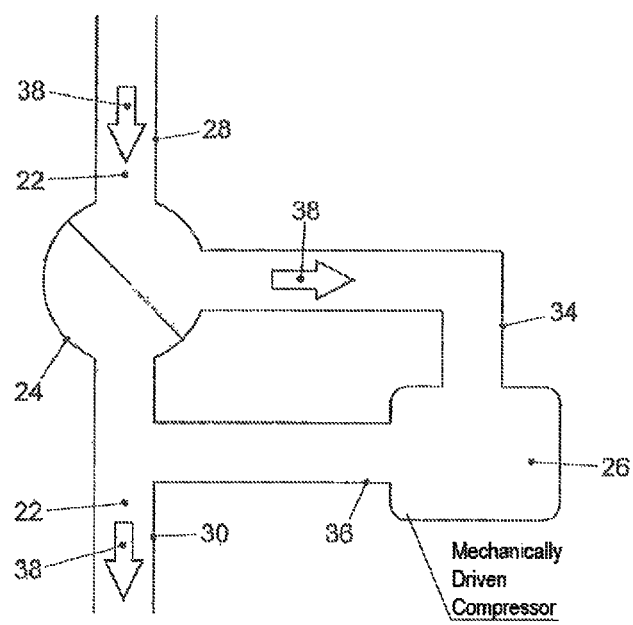
FIG. 3 is a schematic block diagram of an exemplary configuration of an air control/shut-off flap and a mechanically driven compressor in a charge air section for the first preferred embodiment according to FIG. 1, wherein the air control/shut-off flap as control flap for the mechanically driven compressor is in a "two-stage operation with exhaust gas turbocharger and mechanically driven compressor" operating position.
Figure 4:
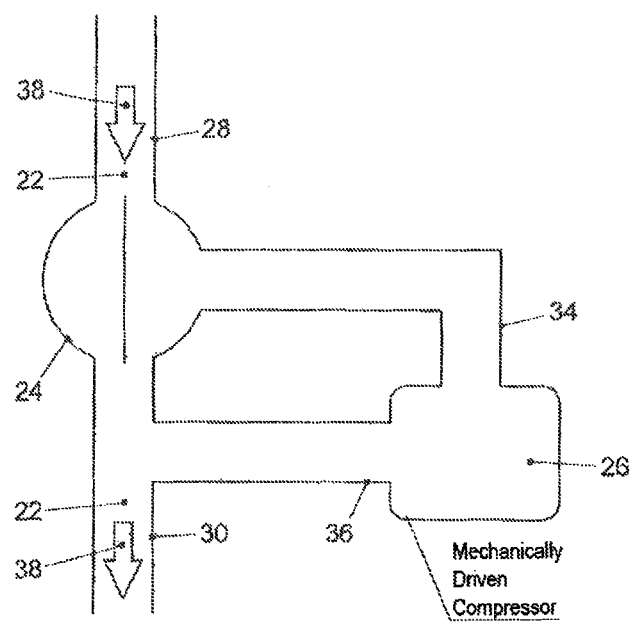
FIG. 4 is a schematic block diagram of the configuration according to FIG. 3, wherein the air control/shut-off flap as control flap for the mechanically driven compressor is in an "only exhaust gas turbocharger operation" operating position.
Figure 5:
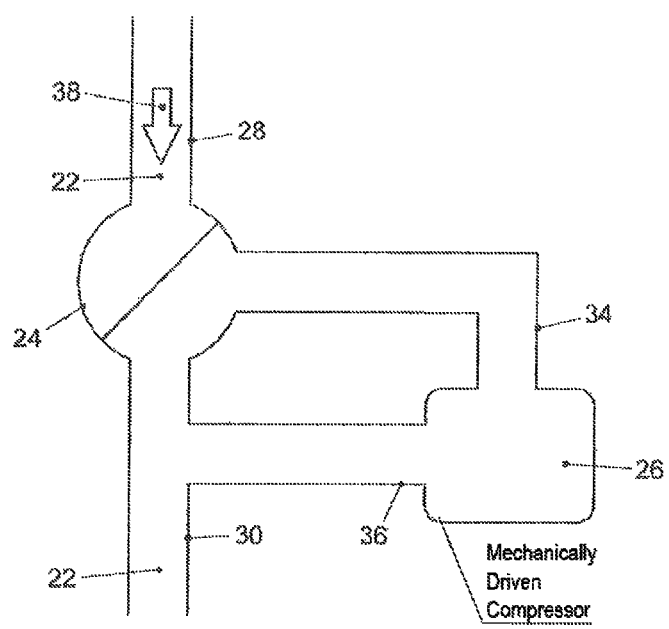
FIG. 5 is a schematic block diagram of the configuration according to FIG. 3, wherein the air control/shut-off flap is in its actual function in a "throttling until completely switched off" operating position.

The additional use of the air control/shut-off flap 24 as a control flap or, respectively, bypass valve for the booster 26 is explained below with reference to FIGS. 3 to 5. In FIGS. 3 to 5, functionally identical components are denoted by the same reference numbers as in FIG. 1, and therefore reference is made for the explanation thereof to the above description of FIG. 1. FIGS. 3 to 5 show an excerpt of the internal combustion engine illustrated in FIG. 1 with the charge air section 22, air control/shut-off flap 24 and booster 26. A portion of the charge air section 22 coming from the compressor 20 of the exhaust gas turbocharger is denoted by reference number 28, and a portion of the charge air section 22 leading to the cylinders 12 of the internal combustion engine is denoted by reference number 30. Arrows indicate the flow direction of a fresh gas mass flow 38.

In FIG. 3, the air control/shut-off flap 24, in the function thereof as control flap for the booster 26, is in a position for a two-stage operation with exhaust gas turbocharger and booster 26. In other words, the fresh gas mass flow 38 is conducted via the booster 26, and therefore the fresh gas is compressed both by the compressor 20 of the exhaust gas turbocharger and by the booster 26. This position of the air control/shut-off flap 24 is advantageous in those operating phases of the internal combustion engine in which a high charging pressure is desired in the charge air section 22 at a low exhaust gas mass flow or, respectively, a low fresh gas mass flow 38. That portion of the charge air section 22 which leads past the booster 26 is closed as fluidtightly as possible by the air control/shut-off flap 24.

In FIG. 4, the air control/shut-off flap 24, in the function thereof as a control flap for the booster 26, is in a position for an exclusive operation with the exhaust gas turbocharger. The fresh gas mass flow 38 is conducted here completely past the booster 26, and the booster 26 is switched off. This position of the air control/shut-off flap 24 is advantageous in those operating phases of the internal combustion engine in which there is a high exhaust gas mass flow or, respectively, a high fresh gas mass flow. The exhaust gas turbocharger has sufficient power here in order to generate a desired charging pressure in the charge air section 22 through the use of the compressor 20. On the other hand, because of the high fresh gas mass flow 38, the booster 26 would be a large obstacle and would constitute an undesirable flow resistance with corresponding loss of charging pressure.

In FIG. 5, the air control/shut-off flap 24, in the actual function thereof, is in a position for throttling or, respectively, completely switching off the internal combustion engine. The fluid-conducting path both via the charge air section 22 past the booster 26 and also via the booster 26 itself is essentially completely blocked by the air control/shut-off flap 24.

Figure 2:
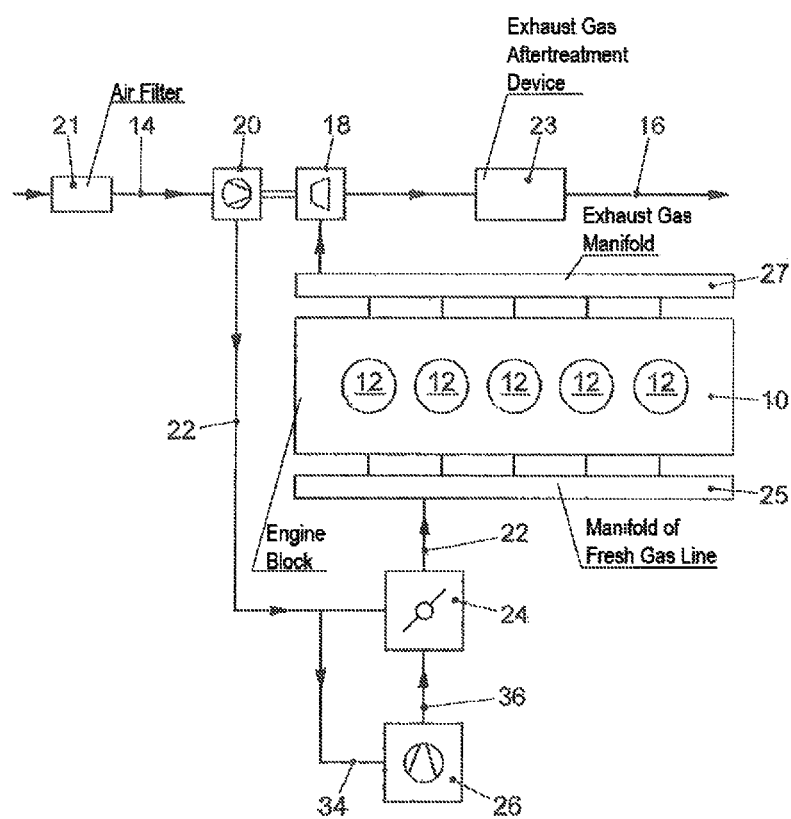
FIG. 2 is a schematic block diagram of a second preferred embodiment of an internal combustion engine according to the invention.

In the second preferred embodiment of an internal combustion engine according to the invention that is illustrated in FIG. 2, functionally identical parts are denoted by the same reference numbers as in FIGS. 1 and 3 to 5, and therefore reference is made for the explanation thereof to the above description of FIGS. 1 and 3 to 5. In the second preferred embodiment according to FIG. 2, the booster 26 is disposed parallel to the air control/shut-off flap 24 in such a manner that the inlet 34 of the booster 26 is connected in a fluid-conducting manner to the charge air section 22 upstream of the air control/shut-off flap 24, and the outlet 36 of the booster 26 is connected in a fluid-conducting manner to the charge air section 22 downstream of the air control/shut-off flap 24 or, respectively, to the air control/shut-off flap 24.

As is already the case in the above-described first preferred embodiment according to FIG. 1, the configuration according to the invention of the booster parallel to the air control/shut-off flap 24 means that no additional bypass duct with a corresponding bypass valve is necessary for the booster 26, but instead the air control/shut-off flap 24 can be used for the bypass function, in which the mass flow of the fresh gas is conducted past the booster 26 and the booster 26 is switched off.

Figure 6:
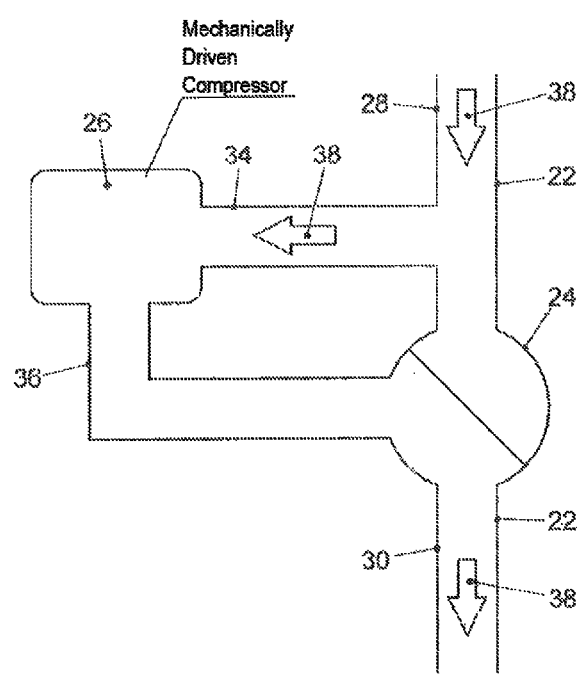
FIG. 6 is a schematic block diagram of an exemplary configuration of an air control/shut-off flap and a mechanically driven compressor in a charge air section for the second preferred embodiment according to FIG. 2, wherein the air control/shut-off flap as control flap for the mechanically driven compressor is in a "two-stage operation with exhaust gas turbocharger and mechanically driven compressor" operating position.
Figure 7:
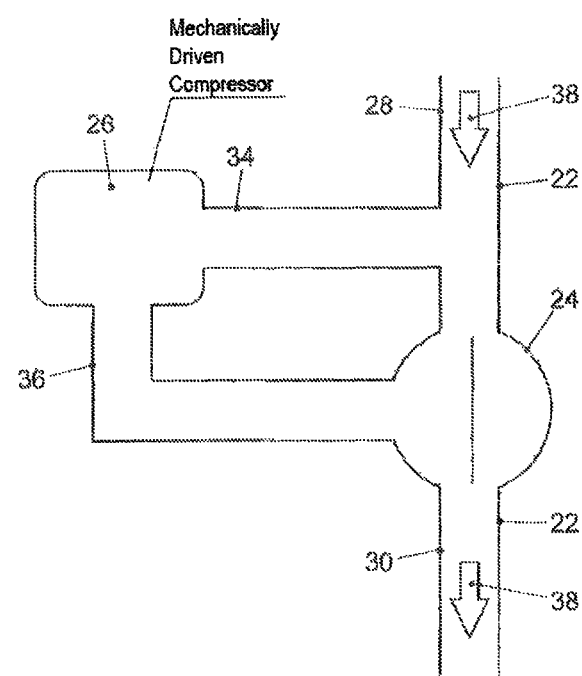
FIG. 7 is a schematic block diagram of the configuration according to FIG. 6, wherein the air control/shut-off flap as control flap for the mechanically driven compressor is in an "only exhaust gas turbocharger operation" operating position.
Figure 8:
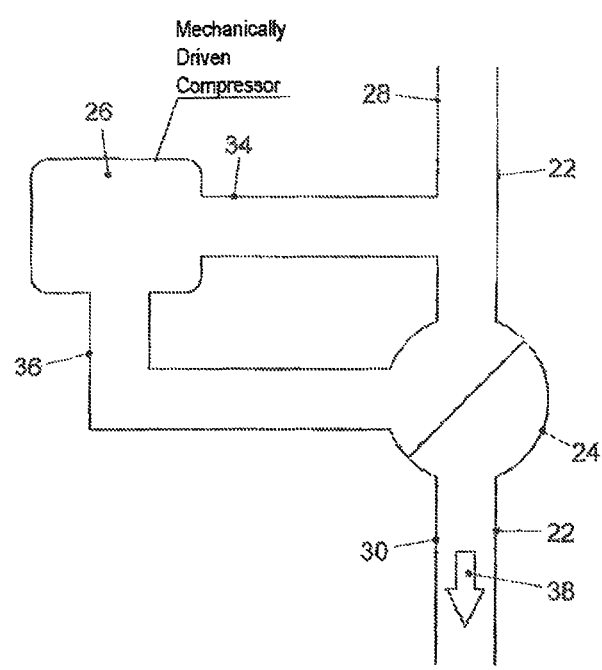
FIG. 8 is a schematic block diagram of the configuration according to FIG. 6, wherein the air control/shut-off flap is in the actual function thereof in a "throttling until completely switched off" operating position.

The additional use of the air control/shut-off flap 24 as a control flap or, respectively, a bypass valve for the booster 26 in the second preferred embodiment is explained below with reference to FIGS. 6 to 8. In FIGS. 6 to 8, functionally identical parts are denoted by the same reference numbers as in FIGS. 1 to 5, and therefore reference is made for the explanation thereof to the above description of FIGS. 1 to 5. FIGS. 6 to 8 show an excerpt of the internal combustion engine, which is illustrated in FIG. 2, with charge air section 22, air control/shut-off flap 24 and booster 26. That portion of the charge air section 22 which comes from the compressor 20 of the exhaust gas turbocharger is denoted by reference number 28, and that portion of the charge air section 22 which leads to the cylinders 12 of the internal combustion engine is denoted by reference number 30. Arrows indicate the flow direction of the fresh gas mass flow 38.

In FIG. 6, the aft control/shut-off flap 24, in the function thereof as a control flap for the booster 26, is in a position for a two-stage operation with exhaust gas turbocharger and booster 26. In other words, the fresh gas mass flow 38 is conducted via the booster 26, and therefore the fresh gas is compressed both by the compressor 20 of the exhaust gas turbocharger and by the booster 26. This position of the air control/shut-off flap 24 is advantageous in those operating phases of the internal combustion engine in which a high charging pressure is desirable in the charge air section 22 at a low exhaust gas mass flow or, respectively, low fresh gas mass flow 38. That portion of the charge air section 22 which leads past the booster 26 is closed as fluidtightly as possible by the air control/shut-off flap 24.

In FIG. 7, the air control/shut-off flap 24, in the function thereof as a control flap for the booster 26, is in a position for an exclusive operation with the exhaust gas turbocharger. The fresh gas mass flow 38 is completely conducted here past the booster 26 and the booster 26 is switched off. This position of the air control/shut-off flap 24 is advantageous in those operating phases of the internal combustion engine in which there is a high exhaust gas mass flow or, respectively, a high fresh gas mass flow. The exhaust gas turbocharger has adequate power here in order to generate a desirable charging pressure in the charge air section 22 through the use of the compressor 20. On the other hand, because of the high fresh gas mass flow 38, the booster 26 would be a large obstacle and would constitute an undesirable flow resistance with corresponding loss of charging pressure. The outlet 36 of the booster 26 is closed as fluidtightly as possible by the air control/shut-off flap 24.

In FIG. 8, the air control/shut-off flap 24, in the actual function thereof, is in a position for throttling or, respectively, completely shutting off the internal combustion engine. The fluid-conducting path via the charge air section 22 is partially or, respectively, essentially completely blocked or closed as fluidtightly as possible downstream of the booster 26 through the use of the air control/shut-off flap 24.

There is optionally additionally a closing mechanism which, in the event of a booster 26 which is switched off as per FIG. 4 or, respectively, FIG. 7, closes the outlet 36 of the booster 26 (in the case of the first embodiment according to FIG. 1 and FIGS. 3 to 5) or the inlet 34 of the booster 26 (in the case of the second embodiment according to FIG. 2 and FIGS. 6 to 8).

In the case of an air control/shut-off flap 24 which is embodied as a flap which is pivotable about an axis, stops are provided for the states according to FIG. 3 or, respectively, according to FIGS. 6, 7 and 8 in order to produce as great an amount of fluidtightness as possible.

Figure 9:
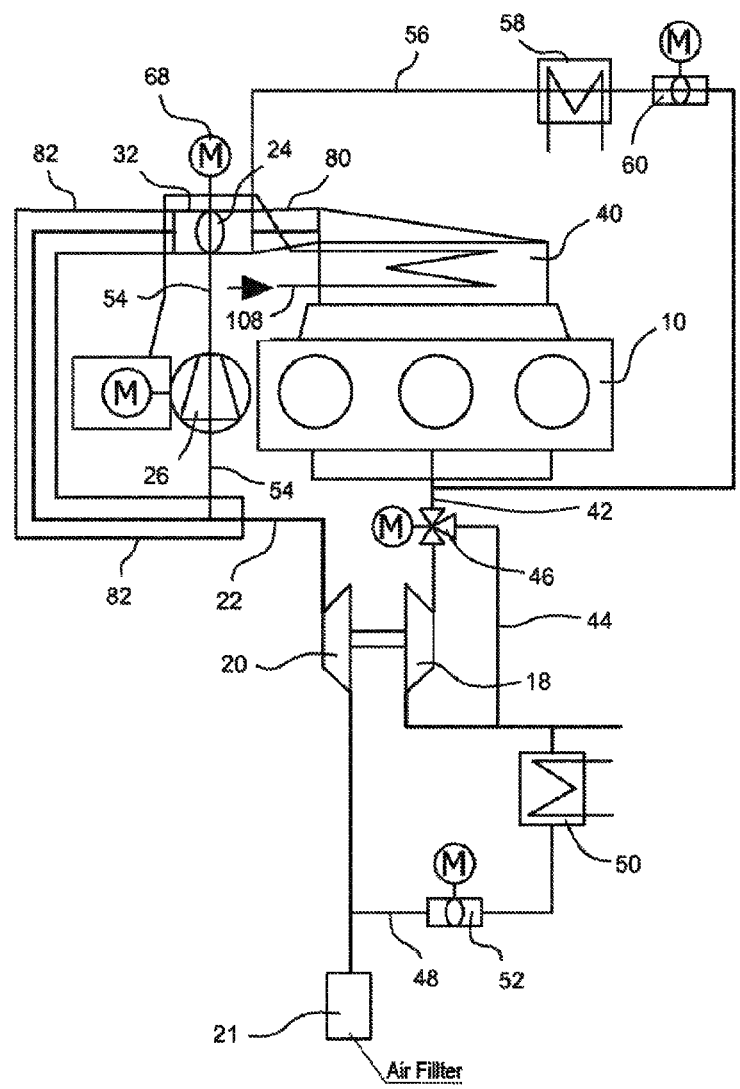
FIG. 9 is a schematic block diagram of a third embodiment of an internal combustion engine according to the invention.

The embodiment of an internal combustion engine according to the invention that is illustrated in FIG. 9 is supplied with a regulated amount of a mixture of exhaust gas and air via a fresh gas supply system. For this purpose, ambient air is sucked up via an air filter 21, the ambient air being mixed with an exhaust gas flow, which is returned by the engine block 10, from a low-pressure exhaust gas recirculating duct 48. The fresh gas passes via the compressor 20 of an exhaust gas turbocharger into a charge air section 22, in which an air control/shut-off flap 24, via which the fresh gas is supplied to the engine block 10 in a controlled manner via a charge air cooler 40, is disposed in a charge air section portion 32. The exhaust gas from the engine block 10 subsequently passes via an exhaust gas line 42 to a turbine 18 of the exhaust gas turbocharger, which turbine can be circumvented via a circumventing line 44, in which a waste gate valve 46 is disposed. Downstream of the turbine 18, the exhaust gas flows either via an exhaust gas aftertreatment device (not illustrated) into the environment or into the low-pressure exhaust gas recirculating duct 48, in which an exhaust gas cooler 50 and an exhaust gas recirculating valve 52 are disposed.

From the charge air section 22, a bypass duct 54, in which an electrically driven compressor ("booster") 26 is integrated, branches off upstream of the charge air section portion 32. The bypass duct 54 opens in the region of the air control/shut-off flap 24 into the charge air section portion 32. When the air control/shut-off flap 24 is open and the booster 26 switched off, the fresh gas flows correspondingly through the charge air section portion 32 since the flow resistance of the booster 26 is then higher than that of the charge air section portion 32. The fresh gas mass flow supplied to the engine block 10 can be controlled here by different "opened" positions of the air control/shut-off flap 24.

In the event of a short-term greatly increased load demand on the internal combustion engine, the problem occurs that the exhaust gas turbocharger is only able to supply a corresponding charging pressure after a delay since, for this purpose, first of all a correspondingly increased exhaust gas mass flow has to flow through the turbine 18. In such operating states of the internal combustion engine, it is provided to operate the booster 26 and at the same time to move the air control/shut-off flap 24 into a (first) position in which the air control/shut-off flap doses the charge air section portion 32 upstream of the outlet of the bypass duct 54 such that essentially all of the fresh gas is also guided via the booster 26 and, in the process, is additionally compressed. As a result, the required charging pressure is supplied in the short term to the engine block 10.

Furthermore, a high-pressure exhaust gas recirculating duct 56, in which an exhaust gas cooler 58 and an exhaust gas recirculating valve 60 for controlling the recirculated quantity of exhaust gas are disposed, branches off from the exhaust gas line upstream of the turbine 18. The high-pressure exhaust gas recirculating duct 56 opens at a short distance downstream of the charge air section portion 32 into the charge air section 22. In particular during operation of the internal combustion engine at low or medium loads, the pressure drop via the air control/shut-off flap 24 can be increased by changing the setting angle of the air control/shut-off flap 24 such that, as a consequence of a (negative) pressure which is then further reduced in the region of the mouth of the high-pressure exhaust gas recirculating duct 56, an increased exhaust gas flow can be returned to the engine block 10.

Figure 10:
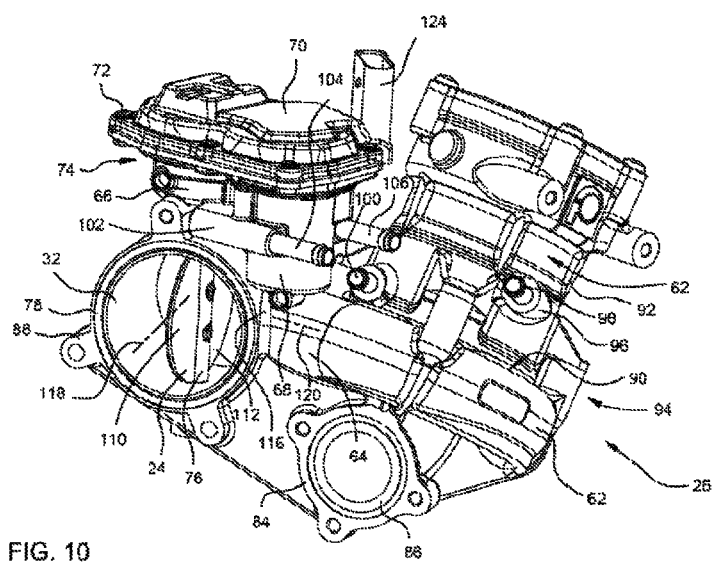
FIG. 10 is a diagrammatic perspective view of an assembly integrating a charge air section portion, an electrically driven compressor and a charge air/shut-off flap in accordance with the invention.

FIG. 10 illustrates an assembly which integrates the charge air section portion 32, the booster 26 and the charge air/shut-off flap 24. A flow housing 62 of the booster 26, in which a compressor wheel (not visible) is disposed, is formed integrally, i.e. as one piece, with a housing 78 forming the charge air section portion 32. In the exemplary embodiment illustrated, a bypass duct portion 64 connects a compressor space, which accommodates the compressor wheel, of the flow housing 62 to the charge air section portion 32. The bypass duct portion here constitutes an outlet, which is disposed tangentially to the compressor space, of the bypass duct 54 which opens into the charge air section portion 32 in the region of the air control/shut-off flap, In addition, an actuator housing 66, in which an electric motor 68 is integrated and which is dosed by a cover 70 through the use of screws 72, is formed integrally with the housing 78 of the charge air section portion 32 and therefore also with the flow housing 62. The electric motor 68 can be supplied with current via a plug-in connector 124. The actuator housing 66 together with the electric motor 68, a gearing (not visible) between the electric motor 68 and the air control/shut-off flap 24 and the cover 70, forms an electric actuator 74 for a rotary drive for a flap shaft 76 which penetrates the housing 78 of the charge air section portion 32 centrally or radially and to which the air control/shut-off flap 24 is fastened for rotation therewith. The air control/shut-off flap 24 thus divides the charge air section portion 32 into a side 80 located downstream and a side 82 located upstream. The air control/shut-off flap 24 can be rotated into different positions in the charge air section portion 32 via the electric motor 68. The air control/shut-off flap 24 is divided into two halves 110, 112 by the flap shaft 76.

A flange 84 of an inlet stub 86 of the booster 26 is located in a plane which is inclined only slightly with respect to the plane of a flange 88 of the housing 78 of the charge air section portion 32, and therefore accessibility is provided from one side, which can simplify installation of the assembly. Starting from the flange 84, the inlet stub 86 curves slightly, and therefore the fresh gas flows approximately axially into the compressor space of the booster 26.

A flange 90 is formed on the flow housing 62, on the side opposite the inlet stub 86, likewise only slightly inclined with respect to a fastening surface of the cover 70 of the actuator 74, to which flange is fastened a housing part 92 of the flow housing 62, in which an electric motor (not visible) driving the compressor wheel is disposed, the electric motor driving a shaft (not visible) to which the compressor wheel is fastened for rotation therewith. The electric motor 68 of the actuator 74, the electric motor of the booster 26 and the associated housing parts 66, 92 can thus also be installed from the same direction.

The flow housing 62 together with the housing part 92 for receiving the electric motor of the booster 26 forms a compressor housing 94 in which, in order to protect the electric motor 78 from overheating, there is also formed a coolant duct 96 which is supplied via a coolant inlet stub 98 with coolant which emerges again via a coolant outlet stub 100.

Cooling of this type is also provided for the actuator housing 66, for which purpose the latter forms a coolant duct 102 which protects the electric actuator 74 against overheating. A coolant inlet stub 104 and a coolant outlet stub 106 is also formed here on the actuator housing 66. The coolant ducts 96, 102 can be integrated in a cooling circuit and, for this purpose, are connected in particular to a coolant line 108 of the charge air cooler 40 (cf. FIG. 9).

Figure 11A:
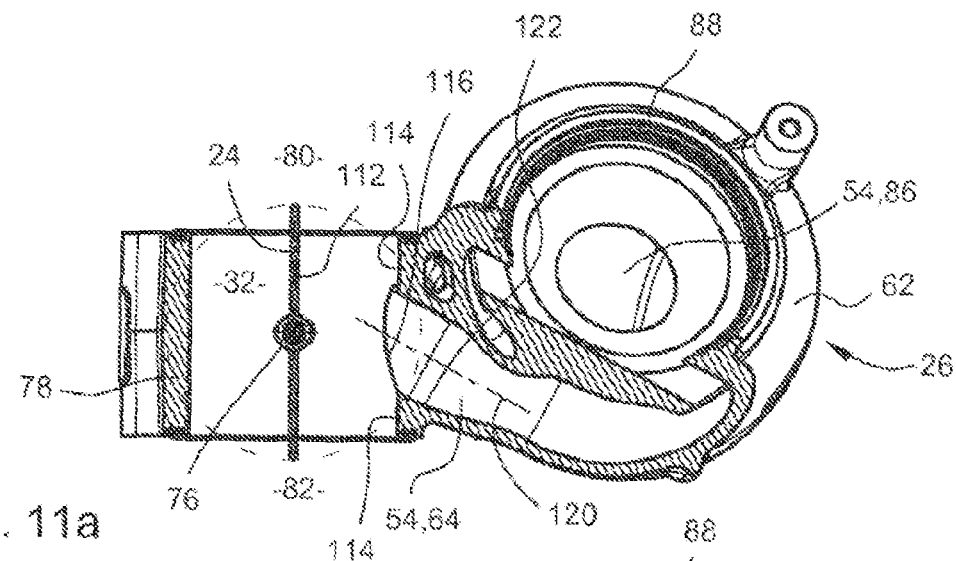
FIGS. 11a to 11c are partially sectional perspective views illustrating a section through part of the assembly according to FIG. 10 with three different flap positions of the charge air/shut-off flap according to the invention.
Figure 11B:
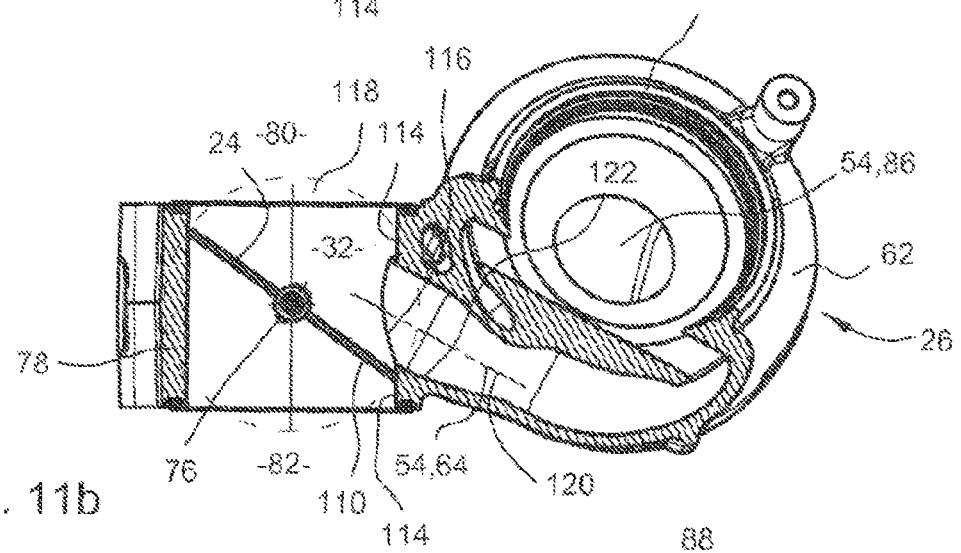
Figure 11C:
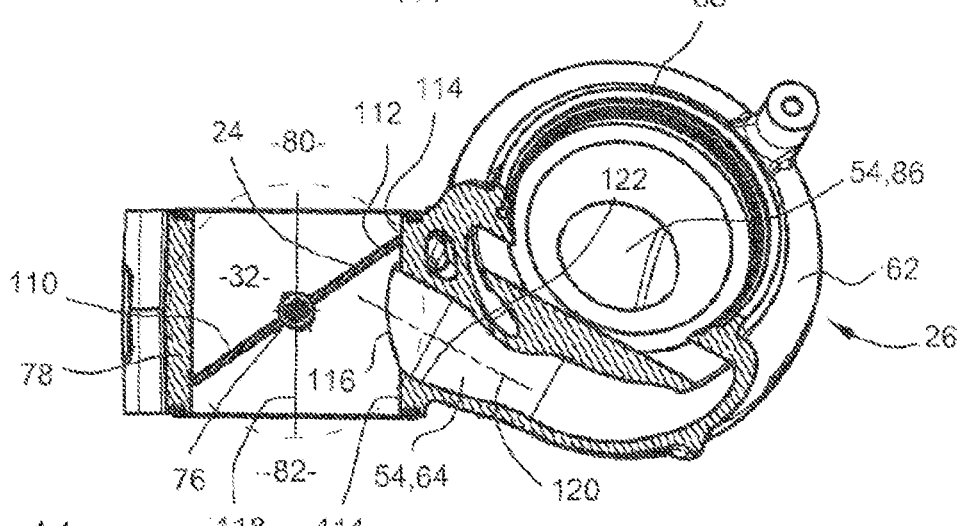

FIGS. 11a to 11c illustrate different positions of the air control/shut-off flap 24 in the charge air section portion 32.

In FIG. 11a, the air control/shut-off flap 24 is in a position which is open as wide as possible and which constitutes a third position according to the invention. There is then a fluid-conducting connection between that side 80 of the charge air section portion 32 which is positioned downstream and that side 82 thereof which is positioned upstream. Such a third position of the air control/shut-off flap 24 is activated through the use of the actuator 74 when the booster is not in operation. The flow resistance in the bypass duct 54 is significantly higher than in the charge air section portion 32 because of the compressor wheel, which is then at a standstill, of the booster 26, and therefore the fresh gas primarily passes via the charge air section portion 32 to the engine block 10. By pivoting the air control/shut-off flap 24, but without moving the latter into a closed position, which is illustrated in FIGS. 11b and 11c, the fresh gas mass flow passing to the engine block 10 can be regulated and at the same time a pressure gradient in the high-pressure exhaust gas recirculating duct 56, which opens into the charge air section 22 downstream of the air control/shut-off flap 24, can be increased such that a greater portion of exhaust gas can be returned to the engine block 10.

FIG. 11b illustrates the air control/shut-off flap 24 in a first position closing the charge air section portion 32. In this first position, the charge air section portion 32 is essentially completely closed, and therefore a direct fluid-conducting connection between that side 80 of the charge air section portion 32 which is located downstream and that side 82 thereof which is located upstream is interrupted, but is provided via the bypass duct 54. In this first position, the first half 110 of the air control/shut-off flap 24 bears against an inner wall 114 of the charge air section portion 32 upstream of an outlet 116 of the bypass duct portion 64. In addition, the first half 110 of the air control/shut-off flap 24 lies upstream with respect to the second half 112 of the air control/shut-off flap 24. The angle which the flap surface spanned by the air control/shut-off flap 24 in this first position encloses with respect to a central longitudinal axis 118 of the charge air section portion 32 is approximately 5° smaller than the angle which a central longitudinal axis 120 of the bypass duct portion 64 encloses with the central longitudinal axis 118 of the charge air section portion 32. The air control/shut-off flap 24 therefore runs in an inclined manner from the bypass duct portion 64 in the direction of the charge air section portion 32 and extends a radially outer wall portion 122 of the bypass duct portion 64.

The first position of the air control/shut-off flap 24 is set when the booster 26 is operated because of a short-term greatly increased load demand on the internal combustion engine and a delayed charging pressure buildup of the exhaust gas turbocharger is intended to be compensated for by the booster 26. In this position of the air control/shut-off flap 24, the fresh gas mass flow supplied to the engine block 10 can be controlled via the rotational speed of the booster 26.

If operation of the combustion engine of the internal combustion engine is set, the air control/shut-off flap 24 is moved into the second position, which is illustrated in FIG. 11c and closes the charge air section portion 32. In this position, the air control/shut-off flap 24 bears with the second half 112 of the air control/shut-off flap 24 against the inner wall 114 of the charge air section portion 32, but this time downstream of the bypass duct portion 64. Fresh gas cannot therefore flow as far as the engine block 10 either directly via the charge air section portion 32 or via the bypass duct 54. As a result, afterrunning of the combustion engine due to inadvertent ignition after shutdown can be reliably prevented.

Through the use of the refinement according to the invention of an internal combustion engine, various functions of a plurality of throttle flaps provided in known combustion engines are therefore realized through the use of a single air control/shut-off flap 24. The latter serves as a control flap for controlling the fresh gas and controlling the pressure gradient in the high-pressure exhaust gas recirculating duct 56, as a switch-over means for the integration as required of a bypass duct 54, which integrates the booster 26, into the charge air section 22 and, as shut-off flap, prevents afterrunning of a combustion engine of the internal combustion engine. An internal combustion engine which has a reduced number of components can therefore be realized according to the invention, as a result of which the outlay on production and the outlay on installation are reduced.

LIST OF REFERENCE CHARACTERS

10 Engine block
12 Working cylinder
14 Fresh gas line
16 Exhaust gas line
18 Turbine
20 Compressor
21 Air filter
22 Charge air section
23 Exhaust gas aftertreatment device
24 Air control/shut-off flap
25 Manifold of the fresh air line 14
26 Mechanically driven compressor/booster
27 Exhaust gas manifold of the exhaust gas line 16
28 Portion of the charge air section 22 coming from the compressor 20 of the exhaust gas turbocharger
30 A portion of the charge air section 22 leading to the cylinders 12 of the internal combustion engine
32 Charge air section portion
34 Inlet of the booster 26
36 Outlet of the booster 26
38 Fresh gas mass flow
40 Charge air cooler
42 Exhaust gas line
44 Circumventing line
46 Waste gate valve
48 Low-pressure exhaust gas recirculating duct
50 Exhaust gas cooler
52 Exhaust gas recirculating valve
54 Bypass duct 56 High-pressure exhaust gas recirculating duct
58 Exhaust gas cooler
60 Exhaust gas recirculating valve
62 Flow housing of the booster
64 Bypass duct portion
66 Actuator housing
68 Electric motor
70 Cover
72 Screws
74 Actuator
76 Flap shaft
78 Housing of the charge air section portion
80 Side of the charge air section portion located downstream
82 Side of the charge air section portion located upstream
84 Flange
86 Inlet stub
88 Flange
90 Flange
92 Housing part of the flow housing
94 Compressor housing
96 Coolant duct
98 Coolant net stub
100 Coolant outlet stub
102 Coolant duct
104 Coolant inlet stub
106 Coolant outlet stub
108 Coolant line
110 First half of the air control/shut-off flap
112 Second half of the air control/shut-off flap
114 inner wall of the charge air section portion
116 Outlet of the bypass duct portion
118 Central longitudinal axis of the charge air section portion
120 Central longitudinal axis of the bypass duct portion
122 Wall portion
124 Plug-in connector

What is claimed is:

1. An internal combustion engine comprising:
working cylinders;
a fresh gas line for supplying fresh gas to said working cylinders, said fresh gas line having a charge air section;
a mechanically driven compressor disposed in said charge air section of said fresh gas line;
an air control/shut-off flap disposed in said charge air section such that, in dependence on a position of said air control/shut-off flap, a gas mass flow in said charge air section flows completely or partially via said mechanically driven compressor or flows past said mechanically driven compressor;
a bypass duct having an inlet and an outlet, said mechanically driven compressor being integrated in said bypass duct;
said charge air section of said fresh gas line including a charge air section portion, said bypass duct circumventing said charge air section portion;
said air control/shut-off flap being movable onto a first position closing said charge air section portion upstream of said outlet of said bypass duct and downstream of said inlet of the bypass duct; and
said air control/shut-off flap being movable into a second position closing said charge air section portion downstream of said outlet of said bypass duct or upstream of said inlet of said bypass duct.

2. The internal combustion engine according to claim 1, including:
a charging device having a compressor; and
said compressor of said charging device being disposed in said fresh gas line upstream of said mechanically driven compressor.

3. The internal combustion engine according to claim 2, wherein said charging device is an exhaust gas turbocharger.

4. The internal combustion engine according to claim 1, wherein:
said bypass duct integrates said mechanically driven compressor;
said charge air section portion is parallel to said mechanically driven compressor between said inlet and said outlet of said bypass duct; and
said air control/shut-off flap is disposed and configured such that said air control/shut-off flap selectively opens or closes said charge air section portion parallel to said bypass duct.

5. The internal combustion engine according to claim 1, wherein:
said bypass duct integrates said mechanically driven compressor; and
said air control/shut-off flap is disposed and configured such that said air control/shut-off flap selectively opens or closes said outlet of said bypass duct.

6. The internal combustion engine according to claim 1, wherein:
said bypass duct integrates said mechanically driven compressor; and
said air control/shut-off flap is disposed and configured such that said air control/shut-off flap selectively opens or closes said inlet of said bypass duct.

7. The internal combustion engine according to claim 1, wherein said air control/shut-off flap is movable into a third position at least partially unblocking said charge air section portion.

8. The internal combustion engine according to claim 1, including a high-pressure exhaust gas recirculating duct opening into said charge air section downstream of said air control/shut-off flap.

9. The internal combustion engine according to claim 1, wherein:
said mechanically driven compressor has a flow housing;
said bypass duct has a bypass duct portion with a curved profile, said bypass duct portion forms an outlet for said flow housing and has a radially outer wall section bounding a flow in said bypass duct; and
said air control/shut-off flap, in the first position thereof, is disposed as an extension of said radially outer wall section of said bypass duct portion.

10. The internal combustion engine according to claim 9, wherein said bypass duct portion opens into said charge air section portion obliquely with respect to a central longitudinal axis of said charge air section portion.

11. The internal combustion engine according to claim 1, wherein said air control/shut-off flap, in the first position and the second position, is disposed obliquely with respect to a central longitudinal axis of said charge air section portion.

12. The internal combustion engine according to claim 1, wherein:
said bypass duct has a bypass duct portion with a curved profile, said bypass duct portion has a radially outer wall section bounding a flow in said bypass duct; and
an angle between said air control/shut-off flap, in the first position, and a central longitudinal axis of said charge air section portion is up to 10° smaller than an angle between the central longitudinal axis of said charge air section portion and a central longitudinal axis of said bypass duct portion.

13. The internal combustion engine according to claim 1, wherein:
said mechanically driven compressor has a flow housing;
said bypass duct has a bypass duct portion opening into said charge air section portion;
said bypass duct portion and said charge air section portion each have a respective housing; and
said housing of said bypass duct portion is formed integrally with said housing of said charge air section portion and said flow housing of said mechanically driven compressor.

14. The internal combustion engine according to claim 1, wherein said air control/shut-off flap is actuable via an electromotive actuator.

15. A method for operating an internal combustion engine, which comprises:
providing a fresh gas line for supplying fresh gas to working cylinders of the internal combustion engine, wherein a mechanically driven compressor is disposed in a charge air section of the fresh gas line such that the mechanically driven compressor is integrated in a bypass duct circumventing a charge air section portion of the charge air section;
providing an air control/shut-off flap disposed in the charge air section such that a gas mass flow in the charge air section flows completely or partially via the mechanically driven compressor or past the mechanically driven compressor depending on a position of the air control/shut-off flap, wherein the air control/shut-off flap is movable into a first position closing the charge air section portion upstream of an outlet of the bypass duct and downstream of an inlet of the bypass duct, and wherein the air control/shut-off flap is movable into a second position closing the charge air section portion downstream of the outlet of the bypass duct or upstream of the inlet of the bypass duct; and
controlling the air control/shut-off flap such that, when the mechanically driven compressor is switched on for an additional compression of the gas mass flow, the air control/shut-off flap is moved into the first position and such that, when a combustion engine of the internal combustion engine is switched off, the air control/shut-off flap is moved into the second position.

* * * * *